(12) United States Patent
Chen

(10) Patent No.: US 10,798,132 B2
(45) Date of Patent: Oct. 6, 2020

(54) METHODS AND SYSTEMS FOR ENHANCING CYBER SECURITY IN NETWORKS

(71) Applicant: LGS Innovations LLC, Herndon, VA (US)

(72) Inventor: Michael J. Chen, Livingston, NJ (US)

(*) Notice: Subject to any disclaimer, the term of this patent is extended or adjusted under 35 U.S.C. 154(b) by 0 days.

(21) Appl. No.: 16/385,081

(22) Filed: Apr. 16, 2019

(65) Prior Publication Data

US 2019/0245892 A1 Aug. 8, 2019

Related U.S. Application Data

(63) Continuation of application No. 15/275,982, filed on Sep. 26, 2016, now Pat. No. 10,305,935.

(Continued)

(51) Int. Cl.
*H04L 29/06* (2006.01)
*H04L 12/24* (2006.01)
(Continued)

(52) U.S. Cl.
CPC .......... *H04L 63/20* (2013.01); *H04L 12/4641* (2013.01); *H04L 12/4679* (2013.01);
(Continued)

(58) Field of Classification Search
CPC ..... H04L 63/20; H04L 63/08; H04L 12/4679; H04L 61/2015; H04L 63/0272;
(Continued)

(56) References Cited

U.S. PATENT DOCUMENTS 5,951,694 A 9/1999 Choquier et al.
6,330,562 B1 12/2001 Boden et al.
(Continued)

*Primary Examiner* — Mohammad A Siddiqi
(74) *Attorney, Agent, or Firm* — Baker & Hostetler LLP

(57) ABSTRACT

The present application is directed a computer-implemented method for enhancing security and preventing cyber-attacks on a network. The method includes a step of receiving, from a user equipment on the network, information including a source IP address and a destination IP address. The method also includes a step of selecting a first VPN server from a VPN service provider based upon a traffic-type of the user equipment. The method also includes a step of creating, via a graphical user interface, a policy to prevent cyber-attacks such that traffic associated with the information of the user equipment is routed to the first VPN server. The method further includes a step of sending the traffic of the user equipment to the VPN server. The method even further includes a step of provisioning the first VPN server to last a predetermined amount of time base on the created policy. The method yet even further includes a step of coordinating the created policy with a router on the network, with the traffic being sent to the first VPN server via the router. The method yet even further includes a step of sending, after a predetermined condition is met, a request to the VPN service provider to transmit a second VPN server, where the first VPN server terminates when the predetermined condition is met. The application is also directed to a system and method for securing web traffic preventing cyber-attacks on a network.

20 Claims, 9 Drawing Sheets

Related U.S. Application Data

(60) Provisional application No. 62/347,705, filed on Jun. 9, 2016.

(51) Int. Cl.

| | | |
|---|---|---|
| *H04L 12/46* | (2006.01) | |
| *H04L 29/08* | (2006.01) | |
| *H04W 12/08* | (2009.01) | |
| *H04W 4/70* | (2018.01) | |

(52) U.S. Cl.
CPC .......... *H04L 41/22* (2013.01); *H04L 63/0236* (2013.01); *H04L 63/0272* (2013.01); *H04L 63/083* (2013.01); *H04L 63/0823* (2013.01); *H04L 63/0876* (2013.01); *H04L 67/10* (2013.01); *H04L 67/1002* (2013.01); *H04W 4/70* (2018.02); *H04W 12/0806* (2019.01)

(58) Field of Classification Search
CPC ............. H04L 61/6068; H04L 63/0236; H04L 12/4641; H04L 67/1002; H04L 63/083; H04L 63/0823; H04L 67/10; H04L 41/22; H04L 63/0876; H04W 12/08; H04W 4/70
See application file for complete search history.

(56) References Cited

U.S. PATENT DOCUMENTS

| | | | |
|---|---|---|---|
| 6,772,226 B1 | 8/2004 | Bommareddy et al. | |
| 7,283,534 B1 | 10/2007 | Kelly et al. | |
| 8,984,621 B2* | 3/2015 | Burch | G06F 21/33 |
| | | | 726/15 |
| 8,997,206 B2* | 3/2015 | Curcio | H04L 63/0227 |
| | | | 726/15 |
| 9,571,457 B1 | 2/2017 | Hoy et al. | |
| 9,853,896 B2 | 12/2017 | Zheng | |
| 10,305,935 B2* | 5/2019 | Chen | H04L 63/0236 |
| 10,594,746 B1* | 3/2020 | Vanderknyff | H04L 65/1073 |
| 2005/0132229 A1 | 6/2005 | Zhang et al. | |
| 2005/0193103 A1 | 9/2005 | Drabik | |
| 2007/0143851 A1 | 6/2007 | Nicodemus et al. | |
| 2008/0091803 A1 | 4/2008 | Liu | |
| 2008/0222729 A1 | 9/2008 | Chen et al. | |
| 2009/0217358 A1 | 8/2009 | Kumar et al. | |
| 2009/0328192 A1 | 12/2009 | Yang et al. | |
| 2010/0169497 A1 | 7/2010 | Klimentiev et al. | |
| 2010/0242092 A1 | 9/2010 | Harris et al. | |
| 2011/0116493 A1 | 5/2011 | Caceres et al. | |
| 2011/0154443 A1 | 6/2011 | Thakur et al. | |
| 2011/0162062 A1* | 6/2011 | Kumar | H04L 63/0272 |
| | | | 726/15 |
| 2011/0214176 A1 | 9/2011 | Burch et al. | |
| 2012/0151057 A1 | 6/2012 | Paredes et al. | |
| 2012/0233678 A1 | 9/2012 | Pal | |
| 2013/0250947 A1 | 9/2013 | Zheng | |
| 2013/0297933 A1 | 11/2013 | Fiducia et al. | |
| 2013/0311778 A1 | 11/2013 | Cherukuri et al. | |
| 2014/0119189 A1 | 5/2014 | Lin | |
| 2014/0230044 A1 | 8/2014 | Liu et al. | |
| 2014/0351801 A1 | 11/2014 | Shin et al. | |
| 2015/0143501 A1 | 5/2015 | Cherukuri et al. | |
| 2015/0288765 A1* | 10/2015 | Skraparlis | H04L 12/4641 |
| | | | 709/228 |
| 2015/0365828 A1 | 12/2015 | Saida et al. | |
| 2015/0372982 A1 | 12/2015 | Herle et al. | |
| 2016/0028770 A1 | 1/2016 | Raleigh et al. | |
| 2016/0065422 A1 | 3/2016 | Khargharia et al. | |
| 2016/0065501 A1 | 3/2016 | Watanabe et al. | |
| 2016/0164914 A1 | 6/2016 | Madhav et al. | |
| 2016/0173334 A1 | 6/2016 | Gavrilovic et al. | |
| 2016/0191600 A1 | 6/2016 | Scharber et al. | |
| 2016/0234067 A1 | 8/2016 | Dolganow et al. | |
| 2016/0234103 A1 | 8/2016 | Kotalwar et al. | |
| 2016/0248511 A1 | 8/2016 | Wang et al. | |
| 2016/0261564 A1 | 9/2016 | Foxhoven et al. | |
| 2016/0308907 A1 | 10/2016 | Le | |
| 2017/0149609 A1 | 5/2017 | Tofighbakhsh et al. | |
| 2017/0149629 A1 | 5/2017 | Raleigh et al. | |
| 2017/0171156 A1 | 6/2017 | Schultz et al. | |
| 2017/0230335 A1 | 8/2017 | Walker | |
| 2017/0332312 A1 | 11/2017 | Jung et al. | |
| 2017/0366395 A1* | 12/2017 | Goldfarb | H04L 12/4641 |
| 2018/0077202 A1 | 3/2018 | Xu | |
| 2019/0109781 A1 | 4/2019 | Fan et al. | |
| 2019/0268262 A1 | 8/2019 | Wang | |

\* cited by examiner

METHODS AND SYSTEMS FOR ENHANCING CYBER SECURITY IN NETWORKS

CROSS-REFERENCE TO RELATED APPLICATIONS

This application claims priority to U.S. Provisional Application No. 62/347,705 filed Jun. 9, 2016, and U.S. Non-Provisional application Ser. No. 15/275,982 filed Jun. 26, 2016, the disclosures of which are incorporated by reference in their entireties.

BACKGROUND

1. Field

This application is directed to systems and methods for enhancing security in networks employing virtual private networks (VPNs). In particular, the application is directed to systems and methods for managing policies to control the frequency of employing new VPN servers.

2. Related Art

VPNs have become increasingly popular over the last decade. In particular, VPNs ensure privacy and data security in corporations, organization and the government. VPNs are generally known as private networks that extend across a public network or the internet. One of the main roles of a VPN is to create an encrypted connection, e.g., tunnel, over a less secure network. As a result, users can securely send and receive information across different networks as if their computing devices were directly connected to the same private network.

Hackers have become quite adept at monitoring and hacking activity of users over a VPN. Hackers are capable of viewing a static VPN IP address and conducting traffic analysis thereon. In turn, hackers can correlate the static VPN IP address to a specific user and/or the associated enterprise. VPN servers including these static VPN IP addresses may be compromised. Thus, they become easy targets for attacks and single points of failure.

What is desired in the art is a system and method for enhancing the security of networks when user equipment accesses the internet via VPN servers.

What is also desired is a system and method that reduces the likelihood of a system being compromised by a hacker.

SUMMARY

The foregoing needs are met, to a great extent, by the application directed to enhancing security in networks accessing the internet via VPN servers.

One aspect of the application is directed to a computer-implemented method for enhancing security and preventing cyber-attacks on a network. The method includes a step of receiving, from a user equipment on the network, information including a source IP address and a destination IP address. The method also includes a step of selecting a first VPN server from a VPN service provider based upon a traffic-type of the user equipment. The method also includes a step of creating, via a graphical user interface, a policy to prevent cyber-attacks such that traffic associated with the information of the user equipment is routed to the first VPN server. The method further includes a step of sending the traffic of the user equipment to the VPN server. The method even further includes a step of provisioning the first VPN server to last a predetermined amount of time base on the created policy. The method yet even further includes a step of coordinating the created policy with a router on the network, with the traffic being sent to the first VPN server via the router. The method yet even further includes a step of sending, after a predetermined condition is met, a request to the VPN service provider to transmit a second VPN server, where the first VPN server terminates when the predetermined condition is met.

Yet another aspect of the application is directed to a computer-implemented system for enhancing security and preventing cyber-attacks on a network. The system includes a non-transitory memory having instructions stored thereon for dynamically managing web traffic of user equipment on the network. The system also includes a display including a graphical user interface. The system also includes a processor, operably coupled to the non-transitory memory. The processor is configured to execute the instructions of receiving information from the user equipment. The processor is further configured to execute the instructions of selecting a first VPN server from a VPN service provider based upon a traffic-type of the user equipment. The processor is further configured to execute the instructions of creating, via the graphical user interface, a policy to prevent cyber-attacks such that traffic associated with the received information of the user equipment is routed to the first VPN server. The processor is yet even further configured to execute the instructions of provisioning the first VPN server to last a predetermined amount of time based on the created policy. The processor is yet even further configured to execute the instructions of coordinating the created policy with a router on the network, with the traffic being sent to the first VPN server via the router. The processor is yet even further configured to execute the instructions of sending, after a predetermined condition is met, a request to the VPN service provider to transmit a second VPN server. The first VPN server terminates when the predetermined condition is met.

Yet even another aspect of the application is directed to a system for securing web traffic to prevent cyber-attacks on a network. The system comprises a policy controller including a non-transitory memory having instructions stored thereon for dynamically managing web traffic of user equipment on the network. The policy controller also includes a display including a graphical user interface. The policy controller also includes a processor, operably coupled to the memory. The processor is configured to execute the instructions of receiving information from the user equipment. The processor is configured to execute the instructions of selecting a first VPN server from a VPN service provider based upon a traffic-type of the user equipment. The processor is further configured to execute the instructions of creating, via the graphical user interface, a policy to prevent cyber-attacks such that traffic associated with the received information of the user equipment is routed to the first VPN server. The processor is further configured to execute the instructions of provisioning the first VPN server to last a predetermined amount of time based on the created policy. The processor is even further configured to execute the instructions of coordinating the created policy with a router on the network, with the traffic being sent to the VPN server via the router. The processor is yet even further configured to execute the instructions of sending, after a predetermined condition is met, a request to the VPN service provider to transmit a second VPN server, and where the first VPN server terminates. The system also includes a router on the network operably coupled to the policy controller to prevent cyber-attacks.

There has thus been outlined, rather broadly, certain embodiments in order that the detailed description thereof herein may be better understood, and in order that the present contribution to the art may be better appreciated. There are, of course, additional embodiments of the invention that will be described below and which will form the subject matter of the claims appended hereto.

BRIEF DESCRIPTION OF THE DRAWINGS

In order to facilitate a fuller understanding of the invention, reference is now made to the accompanying drawings, in which like elements are referenced with like numerals. These drawings should not be construed as limiting the invention and intended only to be illustrative.

DETAILED DESCRIPTION

Figure 1A:
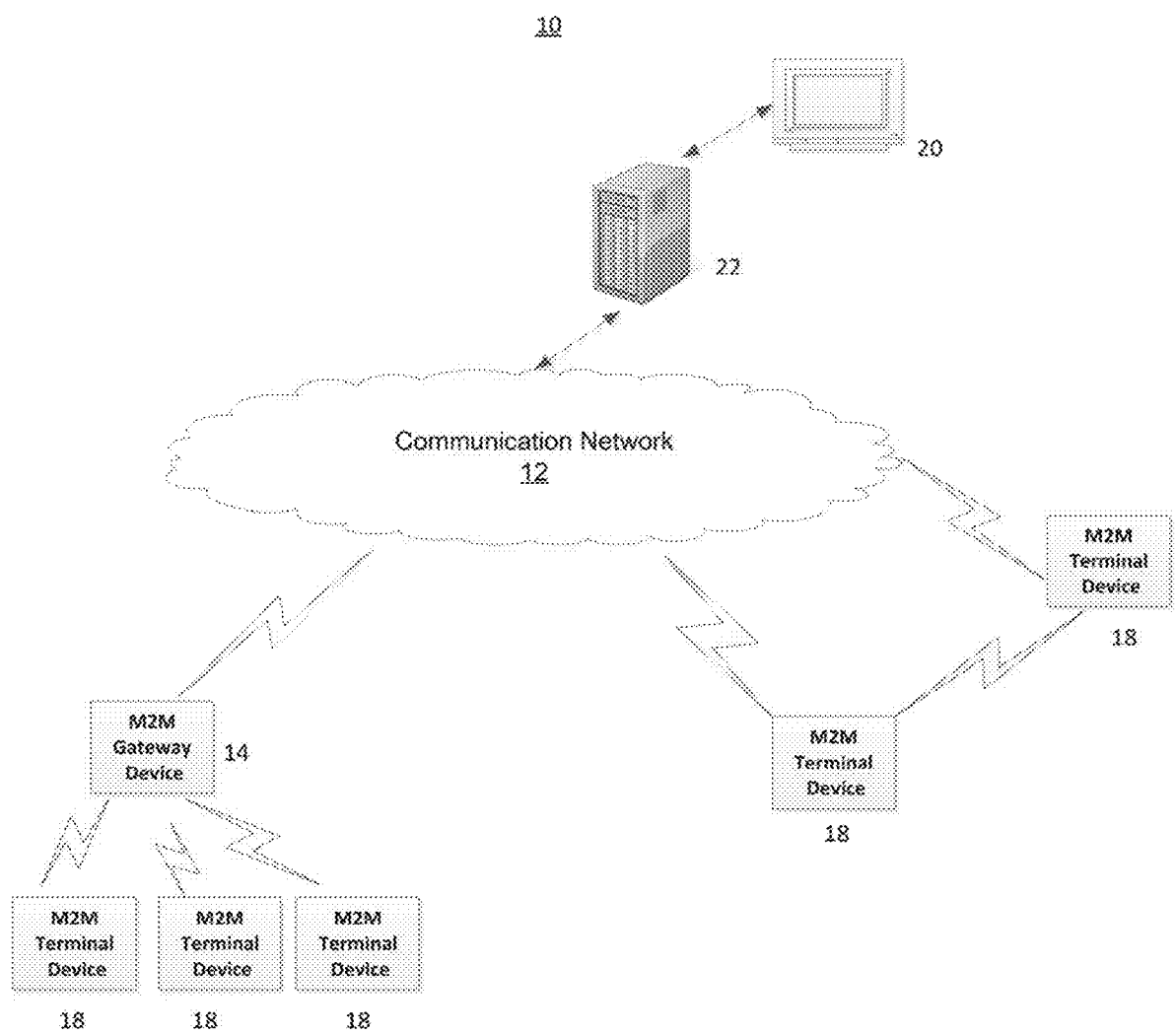
FIG. 1A illustrates a machine-to-machine (M2M) or internet of things (IOT) communication system according to an embodiment of the application.

In this respect, before explaining at least one embodiment of the invention in detail, it is to be understood that the invention is not limited in its application to the details of construction and to the arrangements of the components set forth in the following description or illustrated in the drawings. The invention is capable of embodiments or embodiments in addition to those described and of being practiced and carried out in various ways. Also, it is to be understood that the phraseology and terminology employed herein, as well as the abstract, are for the purpose of description and should not be regarded as limiting.

Reference in this application to "one embodiment," "an embodiment," "one or more embodiments," or the like means that a particular feature, structure, or characteristic described in connection with the embodiment is included in at least one embodiment of the disclosure. The appearances of, for example, the phrases "an embodiment" in various places in the specification are not necessarily all referring to the same embodiment, nor are separate or alternative embodiments mutually exclusive of other embodiments. Moreover, various features are described which may be exhibited by some embodiments and not by the other. Similarly, various requirements are described which may be requirements for some embodiments but not by other embodiments.

The present application describes techniques and systems for enhancing security in a network. Specifically, it has been observed that static IP addresses provide hackers with a greater likelihood of knowing the type of activity that corporations are researching. In turn, this increases the likelihood of hack attempts of the corporate network. To protect the network against hackers, the techniques in this application involve dynamically changing VPN servers that user equipment in the enterprise use to access the internet. In addition, the VPN servers may change due to predetermined conditions to further improve security of the network.

General Architecture

FIG. 1A is a diagram of an exemplary machine-to-machine (M2M), Internet of Things (IoT), or Web of Things (WoT) communication system 10 in which one or more disclosed embodiments may be implemented. Generally, M2M technologies provide building blocks for the IoT/WoT, and any M2M device, gateway or service platform may be a component of the IoT/WoT as well as an IoT/WoT service layer, etc.

As shown in FIG. 1A, the M2M/IoT/WoT communication system 10 includes a communication network 12. The communication network 12 may be a fixed network, e.g., Ethernet, Fiber, ISDN, PLC, or the like or a wireless network, e.g., WLAN, cellular, or the like, or a network of heterogeneous networks. For example, the communication network 12 may comprise of multiple access networks that provides content such as voice, data, video, messaging, broadcast, or the like to multiple users. For example, the communication network 12 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like. Further, the communication network 12 may comprise other networks such as a core network, the Internet, a sensor network, an industrial control network, a personal area network, a satellite network, a home network, or an enterprise network for example. An enterprise network will be used in this application to include a satellite network, corporate network and/or home network.

As shown in FIG. 1A, the M2M/I IoT/WoT communication system 10 may include the Infrastructure Domain and the Field Domain. The Infrastructure Domain refers to the network side of the end-to-end M2M deployment, and the Field Domain refers to the area networks, usually behind an M2M gateway. The Field Domain includes M2M gateways 14, such as a Service Capability Server (SCS) with a proxy, and terminal devices 18, such as UE devices. It will be appreciated that any number of M2M gateway devices 14 and M2M terminal devices 18 may be included in the M2M/IoT/WoT communication system 10 as desired. Each of the M2M gateway devices 14 and M2M terminal devices 18 are configured to transmit and receive signals via the communication network 12 or direct radio link. The M2M gateway device 14 allows wireless M2M devices, e.g., cellular and non-cellular as well as fixed network M2M devices, e.g., PLC, to communicate either through operator networks, such as the communication network 12 or direct radio link. For example, the M2M devices 18 may collect data and send data, via the communication network 12 or direct radio link, to an M2M application 20 or M2M devices 18. The M2M devices 18 may also receive data from the M2M application 20 or an M2M device 18. Further, data and signals may be sent to, and received from, the M2M application 20 via an M2M service layer 22, as described below. M2M devices 18 and gateways 14 may communicate via various networks including, cellular, WLAN, WPAN, e.g., Zigbee, 6LoWPAN, Bluetooth, direct radio link, and wireline for example.

Figure 1B:
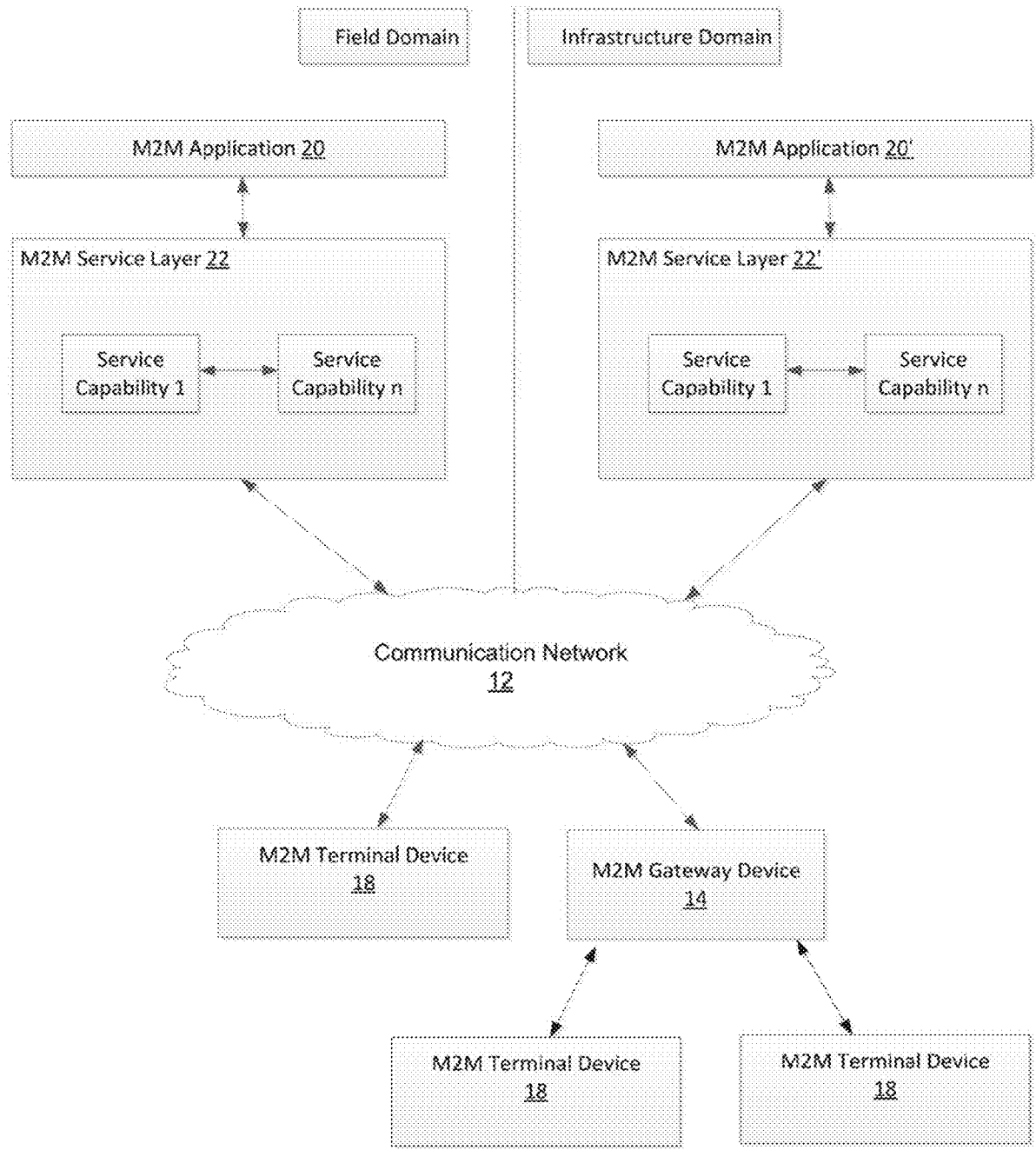
FIG. 1B illustrates a service M2M service platform according to an embodiment of the application.

Referring to FIG. 1B, the illustrated M2M service layer 22 in the field domain provides services for the M2M application 20, M2M gateway devices 14, and M2M terminal devices 18 and the communication network 12. It will be understood that the M2M service layer 22 may communicate with any number of M2M applications, M2M gateway devices 14, such as for example transit common service entities (CSEs), M2M terminal devices 18, such as host CSEs and Originators, as well as communication networks 12 as desired. The M2M service layer 22 may be implemented by one or more servers, computers, or the like. The M2M service layer 22 provides service capabilities that apply to M2M terminal devices 18, M2M gateway devices 14 and M2M applications 20. The functions of the M2M service layer 22 may be implemented in a variety of ways. For example, the M2M service layer 22 could be implemented in a web server, in the cellular core network, in the cloud, etc.

Similar to the illustrated M2M service layer 22, there is the M2M service layer 22' in the Infrastructure Domain. M2M service layer 22' provides services for the M2M application 20' and the underlying communication network 12 in the infrastructure domain. M2M service layer 22' also provides services for the M2M gateway devices 14 and M2M terminal devices 18 in the field domain. It will be understood that the M2M service layer 22' may communicate with any number of M2M applications, M2M gateway devices and M2M terminal devices. The M2M service layer 22' may interact with a service layer by a different service provider. The M2M service layer 22' may be implemented by one or more servers, computers, virtual machines, e.g., cloud/compute/storage farms, etc., or the like.

Referring also to FIG. 1B, the M2M service layer 22 and 22' provide a core set of service delivery capabilities that diverse applications and verticals can leverage. These service capabilities enable M2M applications 20 and 20' to interact with devices and perform functions such as data collection, data analysis, device management, security, billing, service/device discovery etc. Essentially, these service capabilities free the applications of the burden of implementing these functionalities, thus simplifying application development and reducing cost and time to market. The service layer 22 and 22' also enables M2M applications 20 and 20' to communicate through various networks 12 and 12' in connection with the services that the service layer 22 and 22' provide.

The M2M applications 20 and 20' may include applications in various industries such as, without limitation, transportation, health and wellness, connected home, energy management, asset tracking, and security and surveillance. As mentioned above, the M2M service layer, running across the devices, gateways, and other servers of the system, supports functions such as, for example, data collection, device management, security, billing, location Tracking/geo-fencing, device/service discovery, and legacy systems integration, and provides these functions as services to the M2M applications 20 and 20'. Moreover, the M2M service layer may also be configured to interface with other devices such as UEs, service capability servers (SCSs) and mobility management entities (MMEs) as discussed in this application and illustrated in the figures.

Figure 1C:
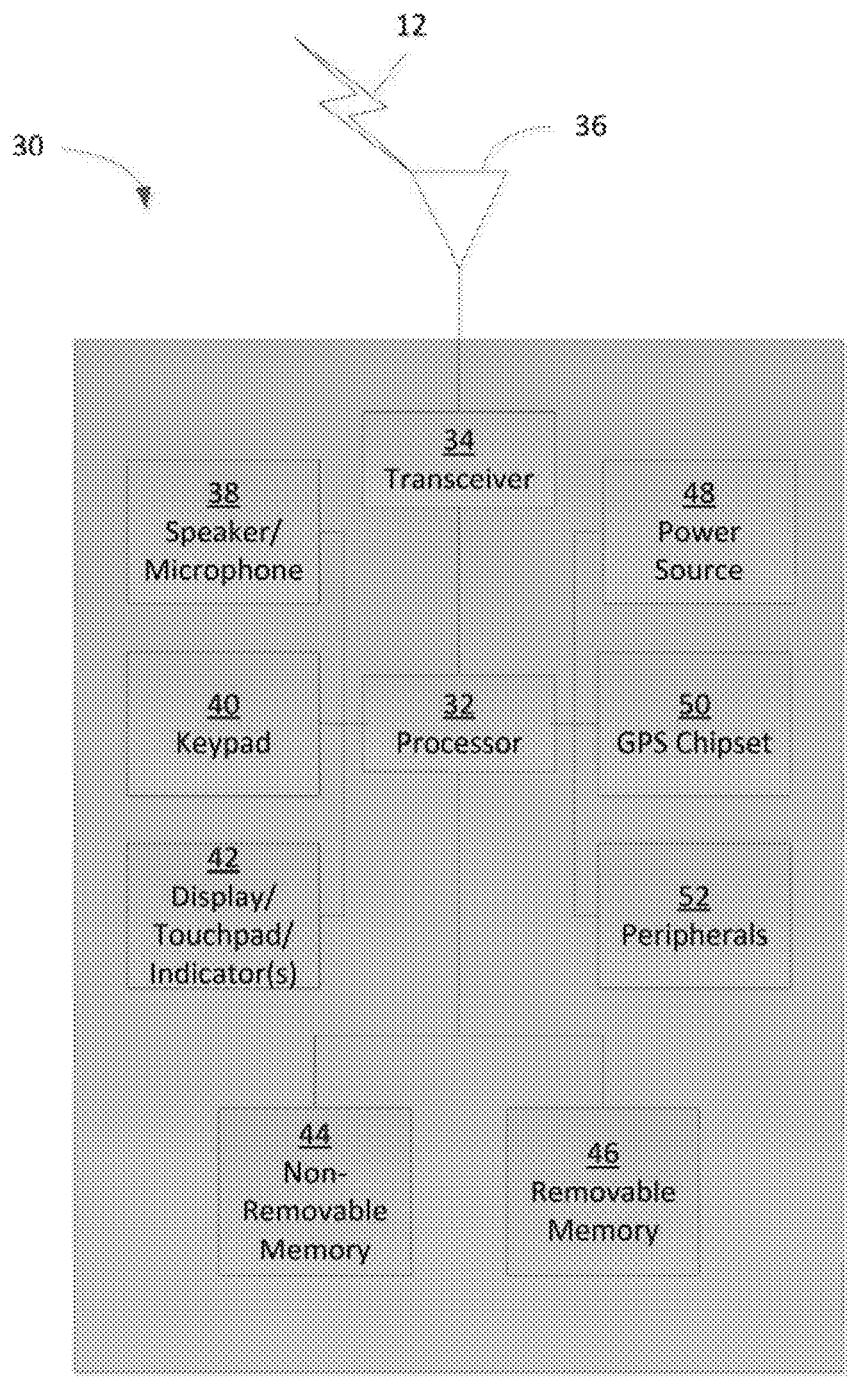
FIG. 1C illustrates a system diagram of an exemplary M2M device according to an embodiment of the application.

The service layer is a software middleware layer that supports value-added service capabilities through a set of Application Programming Interfaces (APIs) and underlying networking interfaces. ETSI M2M's service layer is referred to as the Service Capability Layer (SCL). The SCL may be implemented within an M2M device (where it is referred to as a device SCL (DSCL)), a gateway (where it is referred to as a gateway SCL (GSCL)) and/or a network node (where it is referred to as a network SCL (NSCL)). The oneM2M service layer supports a set of Common Service Functions (CSFs), e.g., service capabilities. An instantiation of a set of one or more particular types of CSFs is referred to as a Common Services Entity (CSE), such as a SCS which may be hosted on different types of network nodes, e.g., infrastructure node, middle node, application-specific node FIG. 1C is a system diagram of an exemplary M2M device 30, such as a M2M terminal device 18 or an M2M gateway device 14 for example. As shown in FIG. 1C, the M2M device 30 may include a processor 32, a transceiver 34, a transmit/receive element 36, a speaker/microphone 38, a keypad 40, a display/touchpad/indicator(s) 42, non-removable memory 44, removable memory 46, a power source 48, a global positioning system (GPS) chipset 50, and other peripherals 52. The display may further include a graphical user interface. It will be appreciated that the M2M device 30 may include any sub-combination of the foregoing elements while remaining consistent with an embodiment. The M2M device 30 may also be employed with other devices, including for example originators and hosting/transit CSEs as described in this application and as illustrated in the figures.

The processor 32 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 32 may perform signal coding, data processing, power control, input/output processing, and/or any other functionality that enables the M2M device 30 to operate in a wireless environment. The processor 32 may be coupled to the transceiver 34, which may be coupled to the transmit/receive element 36. While FIG. 1C depicts the processor 32 and the transceiver 34 as separate components, it will be appreciated that the processor 32 and the transceiver 34 may be integrated together in an electronic package or chip. The processor 32 may perform application-layer programs, e.g., browsers, and/or radio access-layer (RAN) programs and/or communications. The processor 32 may perform security operations such as authentication, security key agreement, and/or cryptographic operations, such as at the access-layer and/or application layer for example.

The transmit/receive element 36 may be configured to transmit signals to, or receive signals from, an M2M service platform 22. For example, in an embodiment, the transmit/receive element 36 may be an antenna configured to transmit and/or receive RF signals. The transmit/receive element 36 may support various networks and air interfaces, such as WLAN, WPAN, cellular, and the like. In an embodiment, the transmit/receive element 36 may be an emitter/detector configured to transmit and/or receive IR, UV, or visible light signals, for example. In yet another embodiment, the transmit/receive element 36 may be configured to transmit and receive both RF and light signals. It will be appreciated that the transmit/receive element 36 may be configured to transmit and/or receive any combination of wireless or wired signals.

In addition, although the transmit/receive element 36 is depicted in FIG. 1C as a single element, the M2M device 30 may include any number of transmit/receive elements 36. More specifically, the M2M device 30 may employ MIMO technology. Thus, in an embodiment, the M2M device 30 may include two or more transmit/receive elements 36, e.g., multiple antennas, for transmitting and receiving wireless signals.

The transceiver 34 may be configured to modulate the signals that are to be transmitted by the transmit/receive element 36 and to demodulate the signals that are received by the transmit/receive element 36. As noted above, the M2M device 30 may have multi-mode capabilities. Thus, the transceiver 34 may include multiple transceivers for enabling the M2M device 30 to communicate via multiple RATs, such as UTRA and IEEE 802.11, for example.

The processor 32 may access information from, and store data in, any type of suitable memory, such as the non-removable memory 44 and/or the removable memory 46. The non-removable memory 44 may include random-access memory (RAM), read-only memory (ROM), a hard disk, or any other type of memory storage device. The removable memory 46 may include a subscriber identity module (SIM) card, a memory stick, a secure digital (SD) memory card, and the like. In other embodiments, the processor 32 may access information from, and store data in, memory that is not physically located on the M2M device 30, such as on a server or a home computer.

The processor 32 may receive power from the power source 48 and may be configured to distribute and/or control the power to the other components in the M2M device 30. The power source 48 may be any suitable device for powering the M2M device 30. For example, the power source 48 may include one or more dry cell batteries, e.g., nickel-cadmium (NiCd), nickel-zinc (NiZn), nickel metal hydride (NiMH), lithium-ion (Li-ion), etc.), solar cells, fuel cells, and the like.

The processor 32 may also be coupled to the GPS chipset 50, which is configured to provide location information, e.g., longitude and latitude, regarding the current location of the M2M device 30. It will be appreciated that the M2M device 30 may acquire location information by way of any suitable location-determination method while remaining consistent with an embodiment.

The processor 32 may further be coupled to other peripherals 52, which may include one or more software and/or hardware modules that provide additional features, functionality and/or wired or wireless connectivity. For example, the peripherals 52 may include an accelerometer, an e-compass, a satellite transceiver, a sensor, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1D:
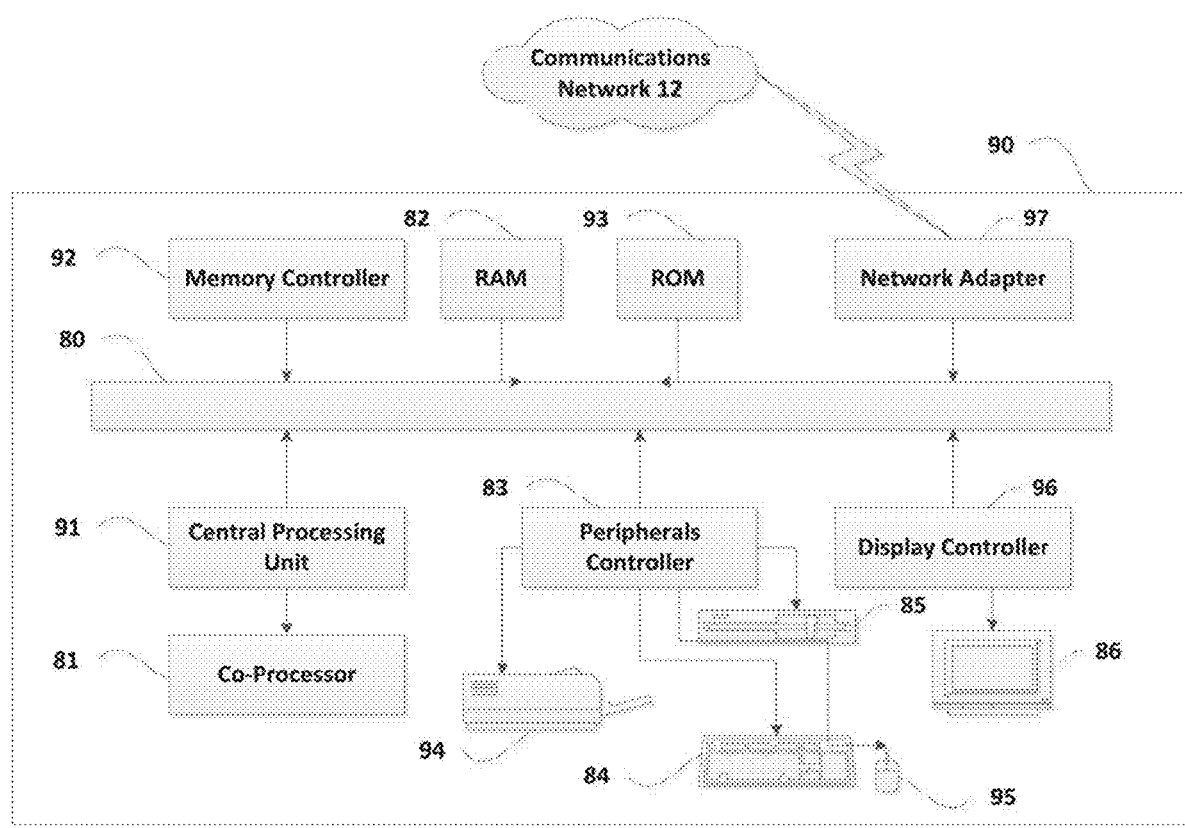
FIG. 1D illustrates a block diagram of an exemplary computing system according to an embodiment of the application.
Figure 4:
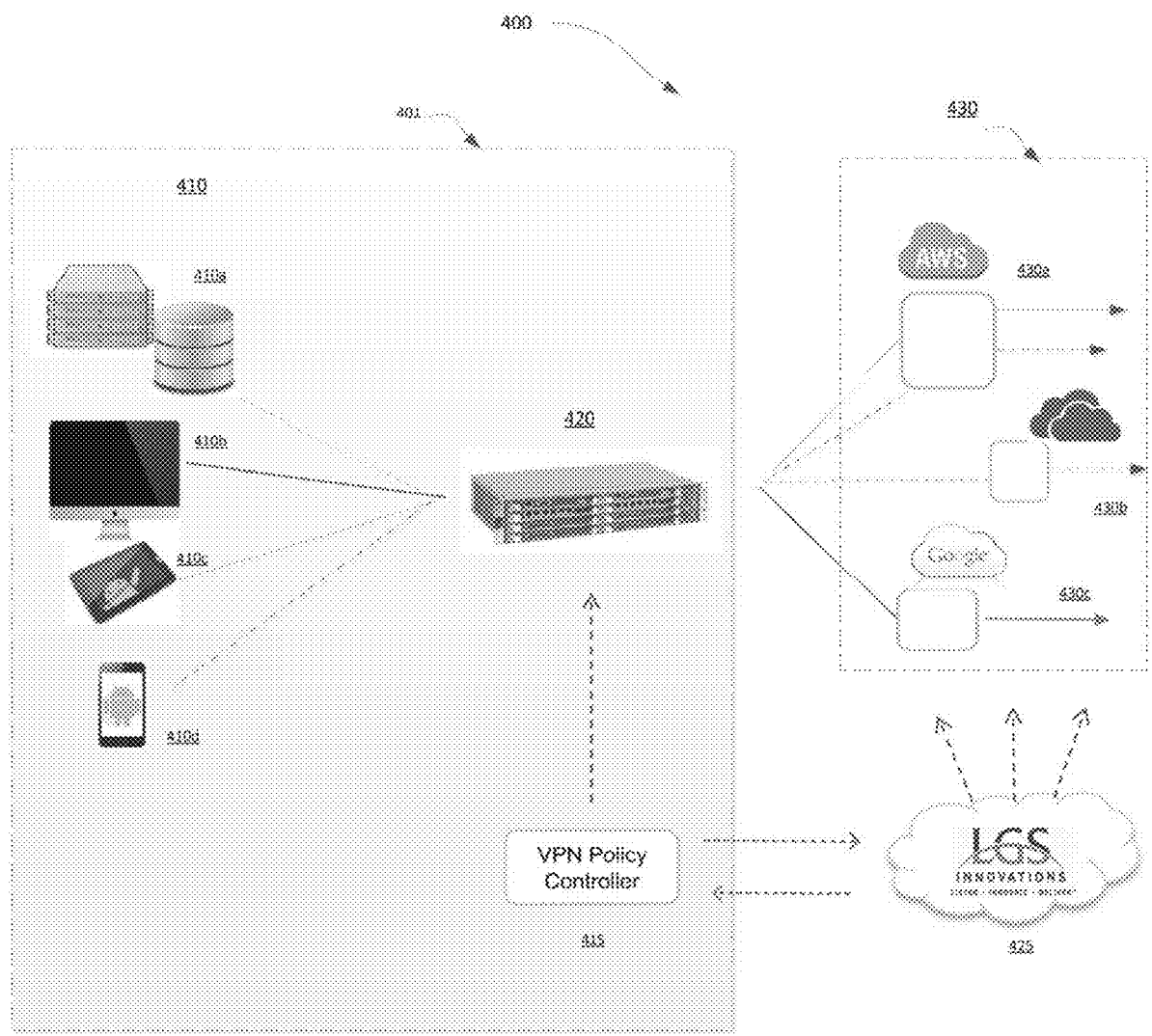
FIG. 4 illustrates an exemplary embodiment of architecture of the application.

FIG. 1D is a block diagram of an exemplary computing system 90 on which, for example, the M2M service platform 22 of FIG. 1A and FIG. 1B may be implemented. As will be described in more detail below, the computing system 90 may be, for example, employed on the VPN service provider, a dynamically generated server or a policy controller of an enterprise network. In an embodiment, the policy controller may be embedded in the gateway router as shown in FIG. 4. Computing system 90 may comprise a computer or server and may be controlled primarily by computer readable instructions, which may be in the form of software, wherever, or by whatever means such software is stored or accessed. Such computer readable instructions may be executed within central processing unit (CPU) 91 to cause computing system 90 to do work. In many known workstations, servers, and personal computers, central processing unit 91 is implemented by a single-chip CPU called a microprocessor. In other machines, the central processing unit 91 may comprise multiple processors. Coprocessor 81 is an optional processor, distinct from main CPU 91 that performs additional functions or assists CPU 91. CPU 91 and/or coprocessor 81 may receive, generate, and process data related to the disclosed systems and methods for embedded semantic naming, such as queries for sensory data with embedded semantic names.

In operation, CPU 91 fetches, decodes, and executes instructions, and transfers information to and from other resources via the computer's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memory devices coupled to system bus 80 include random access memory (RAM) 82 and read only memory (ROM) 93. Such memories include circuitry that allows information to be stored and retrieved. ROMs 93 generally contain stored data that cannot easily be modified. Data stored in RAM 82 can be read or changed by CPU 91 or other hardware devices. Access to RAM 82 and/or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode can access only memory mapped by its own process virtual address space; it cannot access memory within another process's virtual address space unless memory sharing between the processes has been set up.

In addition, computing system 90 may contain peripherals controller 83 responsible for communicating instructions from CPU 91 to peripherals, such as printer 94, keyboard 84, mouse 95, and disk drive 85.

Figure 5:
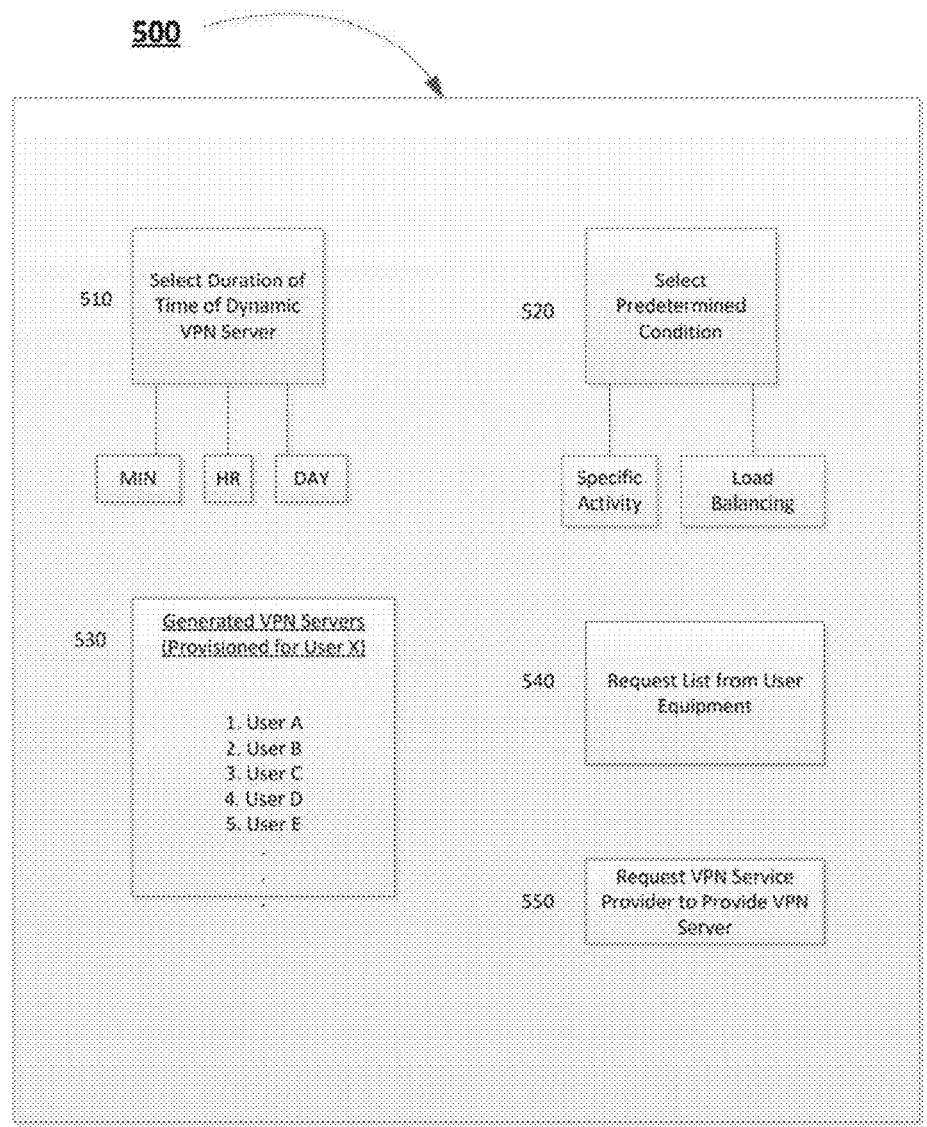
FIG. 5 illustrates an exemplary embodiment of a graphical user interface that is used by an enterprise network system for managing security according to the application.

Display 86, which is controlled by display controller 96, is used to display visual output generated by computing system 90. Such visual output may include text, graphics, animated graphics, and video. Display 86 may also include a graphical user interface (GUI) as shown in FIG. 5. Display 86 may be implemented with a CRT-based video display, an LCD-based flat-panel display, gas plasma-based flat-panel display, or a touch-panel. Display controller 96 includes electronic components required to generate a video signal that is sent to display 86. Display 86, may display sensory data in files or folders using embedded semantics names. Further, computing system 90 may contain network adaptor 97 that may be used to connect computing system 90 to an external communications network, such as network 12 of FIG. 1A and FIG. 1B.

Use Case

Figure 2:
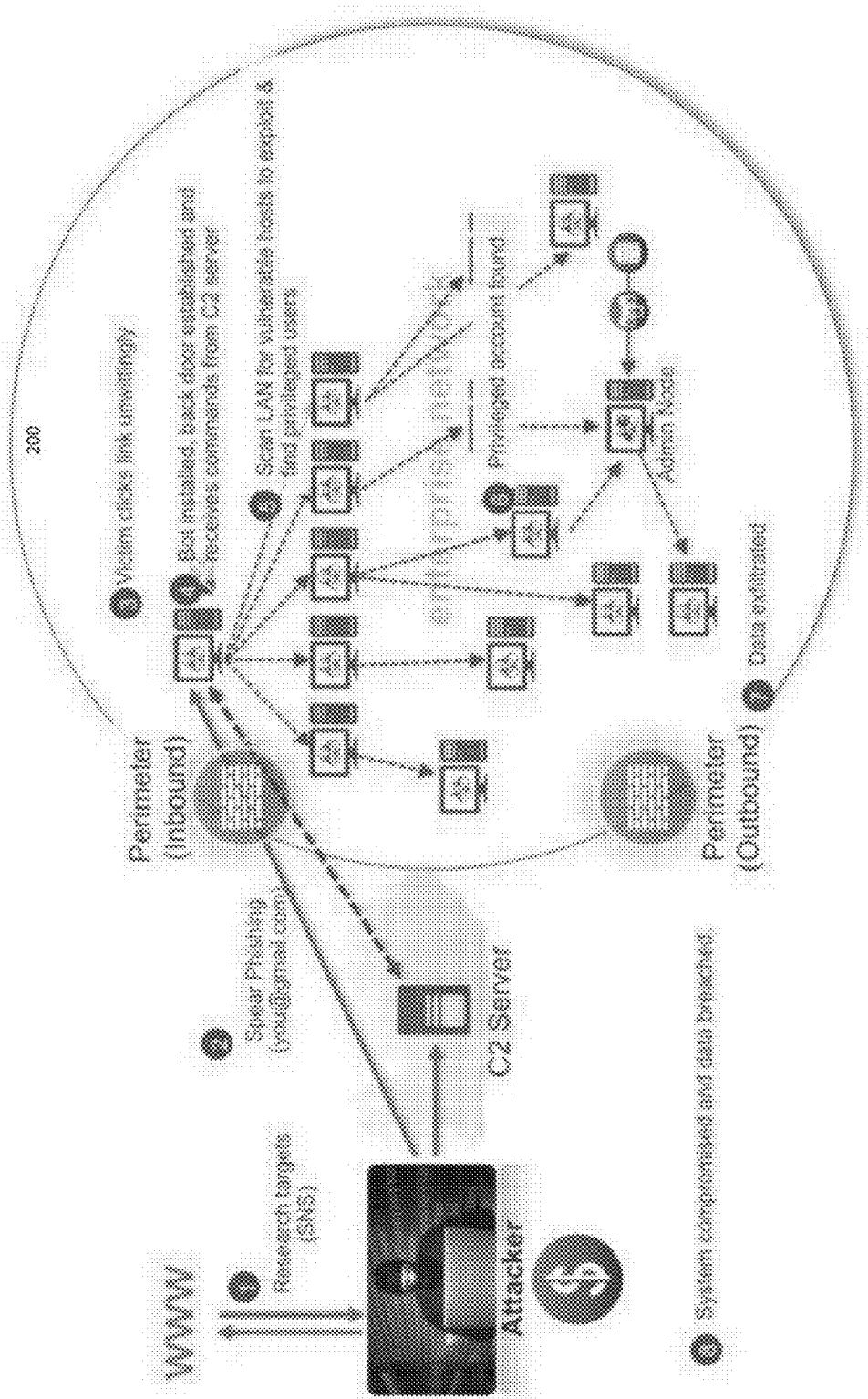
FIG. 2 illustrates a use case of a compromised enterprise network.

FIG. 2 illustrates an exemplary use case of enterprise network vulnerabilities. In FIG. 2, steps are presented by a number encapsulated in a circle. Specifically, a hacker gains access to information within an enterprise network 200. For example, a hacker may be researching targets via the internet to detect vulnerabilities in one or more organizations in order to infiltrate their network. This motive is most likely for financial gain, trade secrets or military information.

The hacker monitors and cross-correlates an organization's internet activity. In conventional systems however, IP addresses remain static. This facilitates easier monitoring of corporate activity by hackers.

Figure 3:
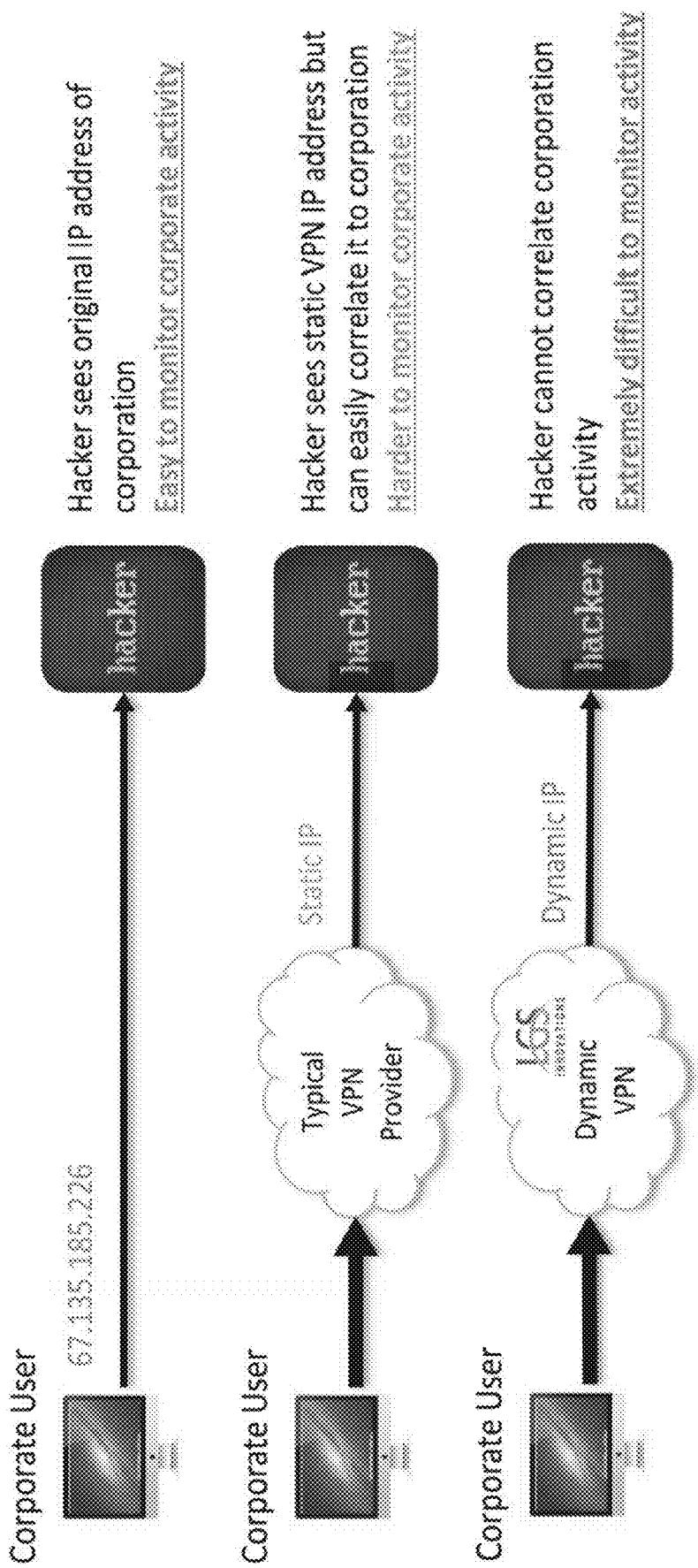
FIG. 3 illustrates a comparison of conventional architectures with an exemplary embodiment of the application.

FIG. 3 illustrates the benefits of the novel obfuscation technology for outbound traffic providing enhanced security in comparison to conventional architectures. For example, scenario 1 illustrates a corporate user accessing the Internet via a specific IP address when there is no VPN solution. The corporate user may be performing Internet research for an acquisition that needs to remain confidential. As a result, a hacker can see the original IP address of the corporation making it easy to monitor corporate activity. This can ultimately result in a cyber-attack as described in the use case illustrated in FIG. 2.

Scenario 2 in FIG. 3 describes an example of a corporate user accessing the Internet to perform research similar to scenario 1. The enterprise network has a conventional corporate VPN solution. Specifically, the VPN is managed by a VPN provider which generates an IP address through which the corporate user accesses the Internet. In this example, a hacker can see a static VPN IP address. The hacker can easily correlate the VPN IP address to a specific corporation. In so doing, the hacker will target the corporate for a cyber-attack as shown in FIG. 2.

Scenario 3 in FIG. 3 describes an exemplary embodiment of the application. In contrast with scenario 2, scenario 3 provides a VPN server with a dynamic IP address from a VPN service provider to the enterprise. In an embodiment, VPN servers are dynamically launched with new IP addresses based upon predetermined conditions. This security feature protects against IP address attribution to reduce the impact of servers being attacked or compromised. In so doing, hackers must overcome additional, exhaustive efforts to correlate corporate activity.

Cloud Computing

Generally, cloud computing resources are delivered as a service over a network connection including but not limited to the Internet. Cloud computing is therefore a type of computing that relies on sharing a pool of physical and/or virtual resources, rather than deploying local or personal hardware and software. One of the key characteristics of cloud computing is the flexibility that it offers and one of the ways that flexibility is offered is through scalability. This refers to the ability of a system to adapt and scale to changes in workload. Cloud technology allows for the automatic provision and de-provision of resource as and when it is necessary, thus ensuring that the level of resource available is as closely matched to current demand as possible. That is, the end user usually pays only for the resource they use and so avoids the inefficiencies and expense of any unused capacity.

Infrastructure as a Service (IaaS) is one of the three fundamental service models of cloud computing alongside Platform as a Service (PaaS) and Software as a Service (SaaS). Specifically, IaaS is specifically that of virtualized hardware, e.g., computing infrastructure. The definition includes such offerings as virtual server space, network connections, bandwidth, IP addresses and load balancers. Physically, the pool of hardware resource is pulled from a multitude of servers and networks usually distributed across numerous data centers, all of which the cloud provider is responsible for maintaining. The client, on the other hand, is given access to the virtualized components in order to build their own IT platforms.

Private Cloud

A private cloud is a particular model of cloud computing that involves a distinct and secure cloud based environment in which only the specified client can operate. As with other cloud models, private clouds will provide computing power as a service within a virtualized environment using an underlying pool of physical computing resource. Here, the pool of resources is only accessible by a single organization providing that organization with greater control and privacy.

Traits that characterize private clouds include the ring fencing of a cloud for the sole use of one organization and higher levels of network security. By contrast, a public cloud has multiple clients accessing virtualized services which all draw their resource from the same pool of servers across public networks. Private cloud services draw their resource from a distinct pool of physical computers, but these may be hosted internally or externally and may be accessed across private leased lines or secure encrypted connections via public networks.

The added security offered by the ring fenced cloud model is ideal for any organization, such as for example an enterprise, that needs to store and process private data or carry out sensitive tasks. For example, a private cloud service could be utilized by a financial company that is required by regulation to store sensitive data internally and who will still want to benefit from some of the advantages of cloud computing within their business infrastructure, such as on demand resource allocation.

Controlling User Equipment Access to a Dynamic VPN Cloud Server

According to an aspect of the application, a novel technique and architecture is provided for enhancing security on a network. FIG. 4 illustrates an exemplary embodiment of the application. Specifically a system 400 is shown representing an enterprise network 401, a VPN service provider 425 and a cloud provider 430. The enterprise network 401 includes equipment 401*a*, *b*, *c* and *d*. The user equipment may include one or more servers or storage 410*a*, personal computers 410*b*, tablets 410*c*, and handset devices 410*d*. The features of the user equipment are described in detail above in regard to FIG. 1C.

Users on user equipment connect to the Internet via gateway/router 420 in the enterprise network 401. More specifically, users access the internet through a VPN server provided to the enterprise network via a VPN service provider 425.

In an embodiment, the cloud provider 430, otherwise known as an internet hosting service (IHS), spawns a cloud server. An IHS is a service that runs Internet servers, allowing organizations and individuals to serve content to the Internet. There are various levels of service and various kinds of services offered. A common kind of hosting is web hosting.

Most IHSs 430 offer a combination of services. Generic kinds of Internet hosting provide a server where the clients can run anything they want (including web servers and other servers) and have Internet connections with good upstream bandwidth. Examples of cloud providers include Amazon web service s 431, Microsoft 432, and Google 433. The servers generated by each of the cloud providers are represented by square boxes.

According to an embodiment, the cloud server is generally spawned upon a request from the VPN service provider 425. The VPN service provider may also be referred to as the proxy server or simply service provider in this application. Cloud servers generally operate in the same way as physical servers. However, clients rent virtual server space rather than renting or purchasing physical servers.

Virtual cloud servers are often paid for by the hour depending on the capacity required at any particular time. In cloud hosting, resources can be scaled up or scaled down accordingly, making it more flexible and, therefore, more cost-effective. When there is more demand placed on the servers, capacity can be automatically increased to match that demand without needing to pay on a permanent basis.

Unlike dedicated servers, cloud servers can be run on a hypervisor. The role of a hypervisor is to control the capacity of operating systems so it is allocated where needed. With cloud hosting, there are multiple cloud servers which are available to each particular client. This allows computing resources to be dedicated to a particular client if and when it is necessary. Where there is a spike in traffic, additional capacity will be temporarily accessed by a website, for example, until it is no longer required. Cloud servers also offer more redundancy. If one server fails, others will take its place.

According to an embodiment, the VPN service provider 425 receives a notification from the cloud provider 430 that the cloud server has been generated. Subsequently, the VPN provider embeds the dynamic server with a VPN. The IP address on the newly created server is distinct from all other IP addresses. The dynamic server may also include other credential material. For example, the credential material may include a username and password.

According to an embodiment, the dynamically generated VPN server may last for a finite period of time. The duration may be fixed or variable. In so doing, hackers have a reduced risk of monitoring activity associated with an IP address. For example, the finite period may be 10 minutes, 20 minutes, 30 minutes, 40 minutes, 50 minutes or 1 hour. The finite period may also be any time ranging between 1 and 24 hours. In some embodiments, the finite period may be any time ranging from 24 hours to 72 hours. In another embodiment, the finite period is configurable by the enterprise 401 or the service provider 425. FIG. 5 illustrates a graphical user interface of a VPN service provider determining the duration of the finite period.

In another embodiment, the dynamically generated VPN server may last until a predetermined condition is met. For example, the condition may be related to a specific activity. The activity may include inactivity, logging on or logging off. For example, if the user is inactive for a certain amount of time, the session on the dynamic server may end. A new session may be initiated in its place, based on enterprise policies. This is completed in a seamless fashion that is transparent to the user though enhances security.

In another embodiment, the activity may include visiting specific websites considered more susceptible to cyber-attacks. For instance, if the user is performing research in a field heavily monitored by hackers, the frequency at which the server is replaced with a new server (and new IP address) will increase.

The predetermined condition may also be related to load balancing requirements. For example, policies may be set by the policy controller 415 whereby only up to 2 users, or X amount of data may be able to go through particular dynamically created VPN server to access the Internet. This is shown, for example in FIG. 4, by the dotted line 401c representative of a data request from a user on a tablet, and the dashed line 401d representative of a data request from a user on a tablet. These users may able to access the internet by having their requests routed through the gateway router 420 to the dynamically generated server hosted by IHS 430a.

In another embodiment, the load balancing requirement may be set up such that different activity types are sent to specific cloud servers. For example, the server hosted by IHS 430a may be related to web traffic. Moreover, the server hosted by IHS 430b may be related to voice traffic. Further, the server hosted by IHS 430c may be related to video traffic.

In yet another embodiment, round-robin load balancing may be employed for distributing client requests across a group of servers. The round-robin technique forwards a client request to each server in turn going down a list. When it reaches the end of the list, the load balancer loops back and goes down the list again (sends the next request to the first listed server, the one after that to the second server, and so on). In an embodiment, weighted round robin may be employed. Here, a weight is assigned to each server based on criteria chosen by the site administrator. One criterion may be the server's traffic-handling capacity. The higher the weight, the larger the proportion of client requests the server receives. In yet another embodiment, dynamic round robin may be employed. Here, a weight is assigned to each server dynamically, based on real-time data about the server's current load and idle capacity.

In yet another embodiment, the enterprise network 401 may include a VPN policy controller 415. The VPN policy controller 415 sets policies for the enterprise network in terms of how users access the Internet. In an embodiment, the VPN policy controller 415 may request the VPN service provider to create a VPN cloud server for a particular user in the enterprise to access the internet. This is illustrated in FIG. 4 via the dotted, lined arrow extending between the policy controller 415 and the VPN service provider 425. According to the application, the policy controller 415 may be housed in the gateway router 420. In another embodiment, the policy controller 415 may be housed separate and distinct from the gateway router 420.

Further, credentials of the dynamic VPN server are sent to an entity, home or enterprise, on the network. The entity may be the enterprise 401, a policy controller 415 or the user equipment. The credentials may include an IP address. The credentials may include a port number. The credentials may include VPN client configuration parameters. The credentials may include client certificates.

According to yet another embodiment, the policy controller 415 may send a request to the VPN service provider 425 to create a VPN server for use by the user equipment. The request may include information of the user equipment. The information may include the type of traffic. The information may include the duration of time the service is required. The information may include the region or location desired.

The policy controller then receives a VPN server from the VPN service provider 425. In one embodiment, the policy controller may be able to select the VPN server based upon the traffic type of the user equipment. In another embodiment, when the policy controller 415 provides the traffic-type of the user equipment, the VPN service provider 425 may select the appropriate VPN server to meet the requirement of the user equipment.

The policy controller 415 creates a policy based upon a review of the credentials of the user equipment. The policy may be stored in a database for future retrieval. The database may be local or remove to the policy controller. The policy correlates traffic of the user equipment to be routed to a VPN server. As will be discussed below in reference to FIG. 5, the policy may be viewed on a display and controlled/changed via a GUI.

In yet another embodiment, the traffic of the user equipment is sent by the policy controller 415 to the VPN server. In an exemplary embodiment, the policy controller sends the traffic to the VPN server via a router 420 as described above in FIG. 1.

According to an embodiment, the traffic from the user equipment to the VPN server terminates when a predetermined condition is met. The predetermined conditions are discussed above in detail. When this occurs, the policy controller 415 contacts the VPN service provider 425 for another VPN server. In an exemplary embodiment, the request is automatically generated and sent from the policy controller 415 after the predetermined condition is met. As a result, the VPN service provider 425 may select a suitable VPN server based upon information of the user equipment or blindly send a VPN server.

In another embodiment, once the second or subsequent VPN server is received by the policy controller 415 or the router 420, the traffic of the user equipment is redirected from the first VPN server to the second VPN server. The IP addresses of the first and second servers are different. This dynamically changing IP addresses based upon a predetermined condition, whether time or event based, helps improve the security of network employing VPN servers to access the internet.

FIG. 5 illustrates an exemplary graphical user interface (GUI) that may be generated based on the methods and systems discussed herein. The GUI 500 of the display interface (e.g., touch screen display) may be located at or operably coupled to the policy controller 415 described above. Here, the policy controller 415 can review, via a portal 540, which requests have been received from user equipment. When the policy controller clicks on the portal, the requests are populated. The policy controller may be able to sort the list of requests in order of receipt. In another embodiment, the list may be sorted in order of priority.

The GUI 500 also includes a portal for requesting the VPN service provider to provide a VPN server (ultimately by embedding security on a server provided by a cloud provider) 550. Here, the policy controller can view which requests have been sent to the VPN service provider. This keeps track of the progress for VPN server receipt and dissemination. In so doing, the VPN service provider is aware of any requests that have not been fulfilled by the VPN service provider. In an embodiment, it is possible that plural VPN service providers provide services to the enterprise. If so, this mechanism permits the policy controller to rank which service provider is most efficient.

The GUI also includes a list of VPN servers 530 and, in some embodiments, a list of users for which the servers are provisioned for. The list ensures that users in the enterprise do not have to wait too long in order to obtain a VPN server.

In an embodiment, the policy controller may provision the server to last for a predetermined period of time based upon a policy. The policies may be located in a database portal 505.

In an alternative embodiment, the policy controller may select a specific time from the user interface at prompt 510 for the server to remain actice. As shown, the duration may be in minutes, hours and/or days. The time may be manually entered or selected from a further drop down of preselected time entries.

In yet another alternative embodiment, the display may include a prompt 520 to select duration based upon a predetermined condition. The condition may be based on an activity. Alternatively, the condition may be based upon load balancing. In an embodiment, the duration may be a combination of a specific time and a predetermined condition.

Figure 6:
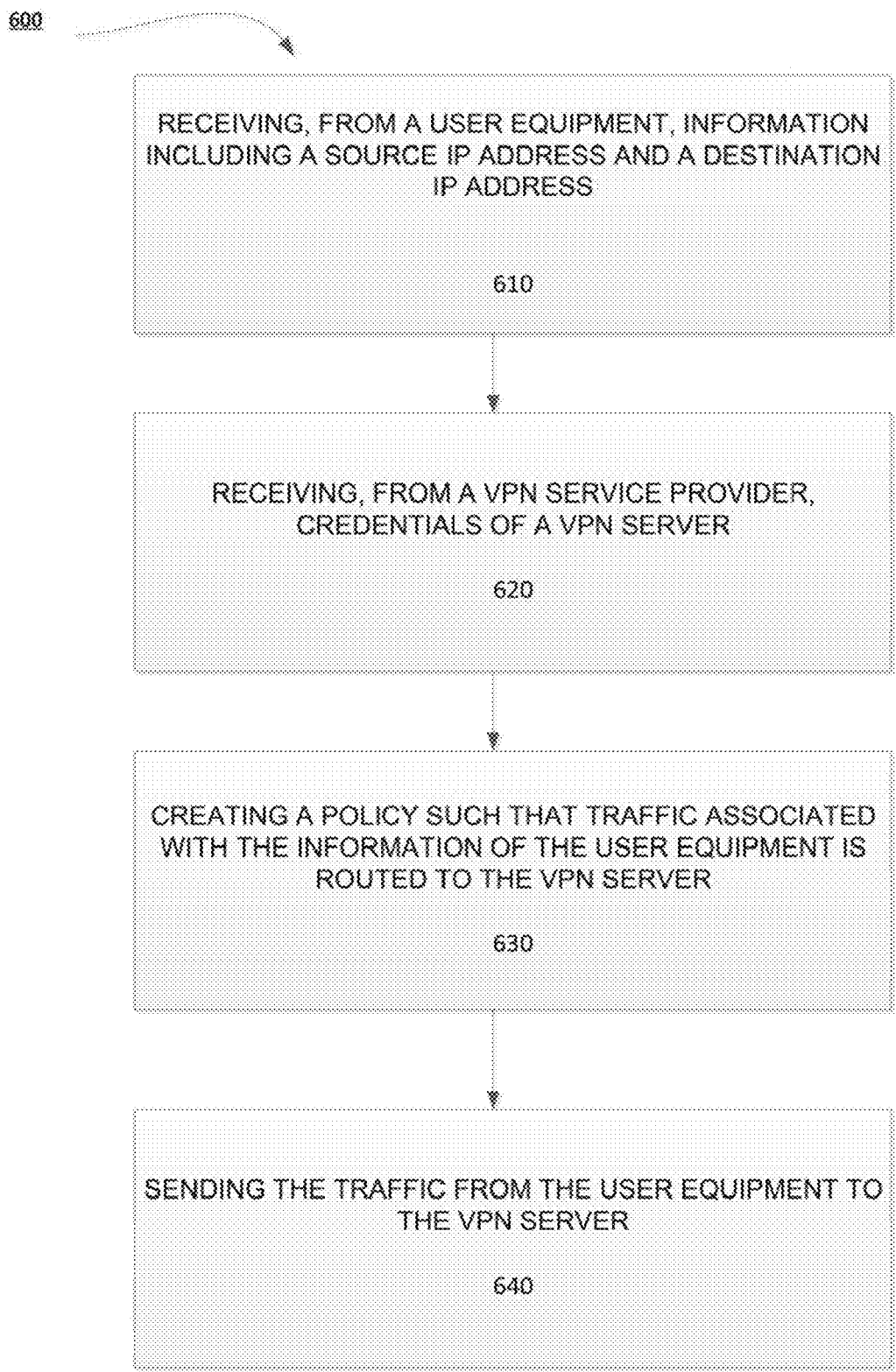
FIG. 6 illustrates an example of a technique employed by an enterprise network system for enhancing security according to the application.

Another aspect of the application describes a method for enhancing security on a network as illustrated in FIG. 6. First, information is received, from user equipment on the network including a source IP address and a destination IP address (step 610). Next, credentials of VPN server are received from a VPN service provider (step 620). Thereafter, a policy is created such that traffic associated with the information of the user equipment is routed to the VPN server (step 630). Subsequently, the traffic of the user equipment is sent to the VPN server (step 640).

While the systems and methods have been described in terms of what are presently considered to be specific aspects, the application need not be limited to the disclosed aspects. It is intended to cover various modifications and similar arrangements included within the spirit and scope of the claims, the scope of which should be accorded the broadest interpretation so as to encompass all such modifications and similar structures. The present disclosure includes any and all aspects of the following claims.

What is claimed is:

1. A computer-implemented method for enhancing security and preventing cyber-attacks on a network comprising:
receiving, from a user equipment on the network, information including a source IP address and a destination IP address;
selecting a first VPN server from a VPN service provider based upon a traffic-type of the user equipment;
creating, via a graphical user interface, a policy to prevent cyber-attacks such that traffic associated with the information of the user equipment is routed to the first VPN server;
provisioning the first VPN server to last a predetermined amount of time based on the created policy;
coordinating the created policy with a router on the network, with the traffic being sent to the first VPN server via the router; and
sending, after a predetermined condition is met, a request to the VPN service provider to transmit a second VPN server,
wherein the first VPN server terminates when the predetermined condition is met.

2. The method of claim 1, further comprising:
redirecting the traffic of the user equipment from the first VPN server to the second VPN server.

3. The method of claim 2, wherein IP addresses of the first and second VPNs are different.

4. The method of claim 1, wherein the predetermined condition is selected from the group consisting of activity-type, traffic-type, load balancing, and combinations thereof.

5. The method of claim 4, wherein the traffic-type is selected from the group consisting of video, web, voice and combinations thereof.

6. The method of claim 5, further comprising:
selecting the VPN server based upon the traffic-type of the user equipment.

7. The method of claim 1, wherein the network is an enterprise network for a company.

8. A computer-implemented system for enhancing web traffic security and preventing cyber-attacks on a network comprising:
a non-transitory memory having instructions stored thereon for dynamically managing web traffic of user equipment on the network;

a display including a graphical user interface; and a processor, operably coupled to the non-transitory memory, the processor configured to execute the instructions of:

receiving information from the user equipment;

selecting a first VPN server from a VPN service provider based upon a traffic-type of the user equipment;

creating, via the graphical user interface, a policy to prevent cyber-attacks such that traffic associated with the received information of the user equipment is routed to the first VPN server;

provisioning the first VPN server to last a predetermined amount of time based on the created policy;

coordinating the created policy with a router on the network, with the traffic being sent to the first VPN server via the router; and sending, after a predetermined condition is met, a request to the VPN service provider to transmit a second VPN server, wherein the first VPN server terminates when the predetermined condition is met.

9. The system of claim 8, wherein the processor is further configured to execute the instructions of redirecting the traffic of the user equipment from the first VPN server to the second VPN server.

10. The system of claim 8, wherein the processor is further configured to execute the instructions of:

configuring the router with the policy; and authorizing the traffic of the user equipment be sent through the configured router to the VPN server.

11. The system of claim 8, wherein the information of the user equipment includes a source IP address and a destination IP address.

12. The system of claim 8, wherein sending of the instructions is performed automatically.

13. The system of claim 8, wherein the processor is further configured to execute the instructions of receiving, from the VPN service provider, credentials of the first and second VPNs.

14. The system of claim 13, wherein IP addresses of the first and second VPNs are different.

15. The system of claim 8, wherein the predetermined condition is selected from the group consisting of activity-type, traffic-type, load balancing, and combinations thereof.

16. The system of claim 15, wherein the traffic-type is selected from the group consisting of video, web, voice, and combinations thereof.

17. A system for securing web traffic to prevent cyber-attacks on a network comprising:

a policy controller including:

a non-transitory memory having instructions stored thereon for dynamically managing web traffic of user equipment on the network;

a display including a graphical user interface; and a processor, operably coupled to the memory, the processor configured to execute the instructions of:

receiving information from the user equipment;

selecting a first VPN server from a VPN service provider based upon a traffic-type of the user equipment;

creating, via the graphical user interface, a policy to prevent cyber-attacks such that traffic associated with the received information of the user equipment is routed to the first VPN server;

provisioning the first VPN server to last a predetermined amount of time based on the created policy;

coordinating the created policy with a router on the network, with the traffic being sent to the VPN server via the router; and sending, after a predetermined condition is met, a request to the VPN service provider to transmit a second VPN server, and where the first VPN server terminates; and a router on the network operably coupled to the policy controller to prevent cyber-attacks.

18. The system of claim 17, wherein the processor of the policy controller is further configured to execute the instructions of redirecting the traffic of the user equipment from the first VPN server to the second VPN server.

19. The system of claim 17, wherein IP addresses of the first and second VPNs are different.

20. The system of claim 17, wherein the processor of the policy controller is further configured to execute the instructions of:

configuring the router with the policy; and authorizing the traffic of the user equipment be sent through the configured router to the VPN server.

* * * * *